United States Patent [19]
Takeda

[11] Patent Number: 5,475,500
[45] Date of Patent: Dec. 12, 1995

[54] IMAGE PROCESSING APPARATUS HAVING A REMOTE MODE FOR PRINTING DATA FROM AN EXTERNAL APPARATUS AND A LOCAL MODE FOR RECORDING AN IMAGE READ BY A COPIER

[75] Inventor: Hiroaki Takeda, Kawasaki, Japan

[73] Assignee: Canon Kabushiki Kaisha, Tokyo, Japan

[21] Appl. No.: 402,323

[22] Filed: Mar. 10, 1995

Related U.S. Application Data

[63] Continuation of Ser. No. 199,651, Feb. 22, 1994, abandoned.

[30] Foreign Application Priority Data

Feb. 22, 1993 [JP] Japan ................................ 5-031853

[51] Int. Cl.⁶ .................................................. H04N 1/32
[52] U.S. Cl. ......................... 358/401; 358/434; 358/437; 358/442; 358/468; 395/113; 395/114
[58] Field of Search .............................. 358/434, 435, 358/436, 437, 438, 439, 468, 442, 401; 395/114, 113

[56] References Cited

U.S. PATENT DOCUMENTS

| | | |
|---|---|---|
| 3,914,539 | 10/1975 | Hashimoto . |
| 4,766,404 | 8/1988 | Ishida et al. . |
| 4,827,349 | 5/1989 | Ogata et al. . |
| 5,006,890 | 4/1991 | Ishida et al. . |
| 5,194,968 | 3/1993 | Nakajima et al. ...................... 358/438 |
| 5,196,944 | 3/1993 | Satake ..................................... 358/468 |

*Primary Examiner*—Scott A. Rogers
*Attorney, Agent, or Firm*—Fitzpatrick, Cella, Harper & Scinto

[57] ABSTRACT

An electronic apparatus includes a first switch for turning on/off a first power supply, a second switch for turning on a second power supply in response to an ON operation of the first switch, a communication unit for performing an image data communication with an external apparatus, and an operation holding unit for holding the ON operation of the first switch in response to an ON operation of the first power supply. The apparatus controls a holding operation of the operation holding unit, and the first and second switches, in accordance with a signal received via the communication unit.

33 Claims, 8 Drawing Sheets

IMAGE PROCESSING APPARATUS HAVING A REMOTE MODE FOR PRINTING DATA FROM AN EXTERNAL APPARATUS AND A LOCAL MODE FOR RECORDING AN IMAGE READ BY A COPIER

This application is a continuation of application Ser. No. 08/199,651 filed Feb. 22, 1994, now abandoned.

BACKGROUND OF THE INVENTION

1. Field of the Invention

The present invention relates to an image processing apparatus such as a digital copying apparatus, a printer, or the like and, more particularly, to a mechanism for controlling the ON/OFF state of a power supply of the image processing apparatus.

2. Related Background Art

In recent years, a digital copying apparatus has become popular, and is often connected to processing apparatuses having a FAX function, printer function, and the like in order to have these functions. More specifically, the digital copying apparatus is used while being connected to various apparatuses. A large number of printers are on the market with the widespread use of computers.

In a digital copying apparatus or printer, its power supply is turned on/off using, e.g., a seesaw switch as a power supply switch, and no mechanism for controlling the ON/OFF state of the power supply in accordance with an external signal is arranged.

However, in the above-mentioned prior art, when data from, e.g., a host computer, is to be printed, the power supply switch of a digital copying apparatus or printer must be turned on first, and then, a print operation must be performed by the host computer, resulting in cumbersome operations for a user. Furthermore, a user may often start a print operation without knowing that the power supply switch is OFF, resulting in time-consuming operations. Thus, in order to avoid such wasteful operations as much as possible, the apparatus may be used while the power supply switch is kept ON all day long. In this case, since the power supply switch is kept ON even in an idle state of the apparatus, electric power is wastefully consumed.

The digital copying apparatus has a mode for performing a normal copying operation (local mode) and a mode for printing data from an external apparatus such as a host computer (remote mode). When the power supply is turned on, one of these modes is set. It is convenient for a user who wants to copy if a copying operation is enabled only by turning on the power supply switch. On the other hand, it is convenient for a user who wants to print out data from a host computer if the remote mode is set by turning on the power supply switch. The conventional digital copying apparatus cannot meet these requirements at the same time.

SUMMARY OF THE INVENTION

It is an object of the present invention to solve the above-mentioned problems.

It is another object of the present invention to provide an image processing apparatus, which can eliminate a troublesome operation of a power supply switch in a print operation, and a wasteful operation such as a print operation when a power supply switch is OFF, and can prevent wasteful power consumption in a non-used state of the apparatus.

According to an image processing apparatus of the present invention, when a power supply of the apparatus is turned on, first switch means is turned on by a first signal received via communication means to turn on a first power supply. When the first power supply is turned on, the operation of the first switch means is held by operation holding means, and second switch means is turned on to turn on a second power supply. Thus, the power supply of the apparatus is turned on. When the power supply of the apparatus is turned off, the holding operation of the operation holding means is canceled upon reception of a second signal received via the communication means, and the second switch means is turned off. Thus, the power supply of the apparatus is turned off.

Also, according to the present invention, when the apparatus is not used for a predetermined period of time after the end of image processing, the first and second switch means are turned off by shut-off means, thus turning off the power supply of the apparatus.

Furthermore, according to the present invention, a fixing heater is energized/deenergized by the second switch means.

DETAILED DESCRIPTION OF THE PREFERRED EMBODIMENTS

The preferred embodiments of the present invention will be described hereinafter with reference to the accompanying drawings.

[First Embodiment]

Figure 1:
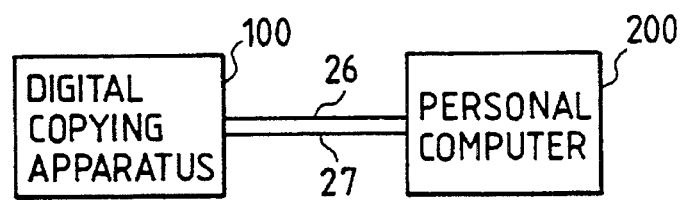
FIG. 1 is a block diagram showing the system arrangement including a digital copying apparatus according to the first to third embodiments of the present invention.

FIG. 1 shows the system arrangement to which a digital copying apparatus according to the first to third embodiments of the present invention is applied.

Referring to FIG. 1, a digital copying apparatus 100 according to an embodiment of the present invention is connected to a personal computer (an external apparatus such as a host computer) 200 via transmission lines 26 and 27.

When the personal computer 200 supplies image data, commands, and the like to the digital copying apparatus 100, the digital copying apparatus 100 performs a predetermined print-out operation. Also, in accordance with commands from the personal computer 200, the digital copying apparatus 100 scans an original, and supplies scanned image data to the personal computer 200. In addition, the digital copying apparatus 100 can independently perform a copying operation.

Figure 2:
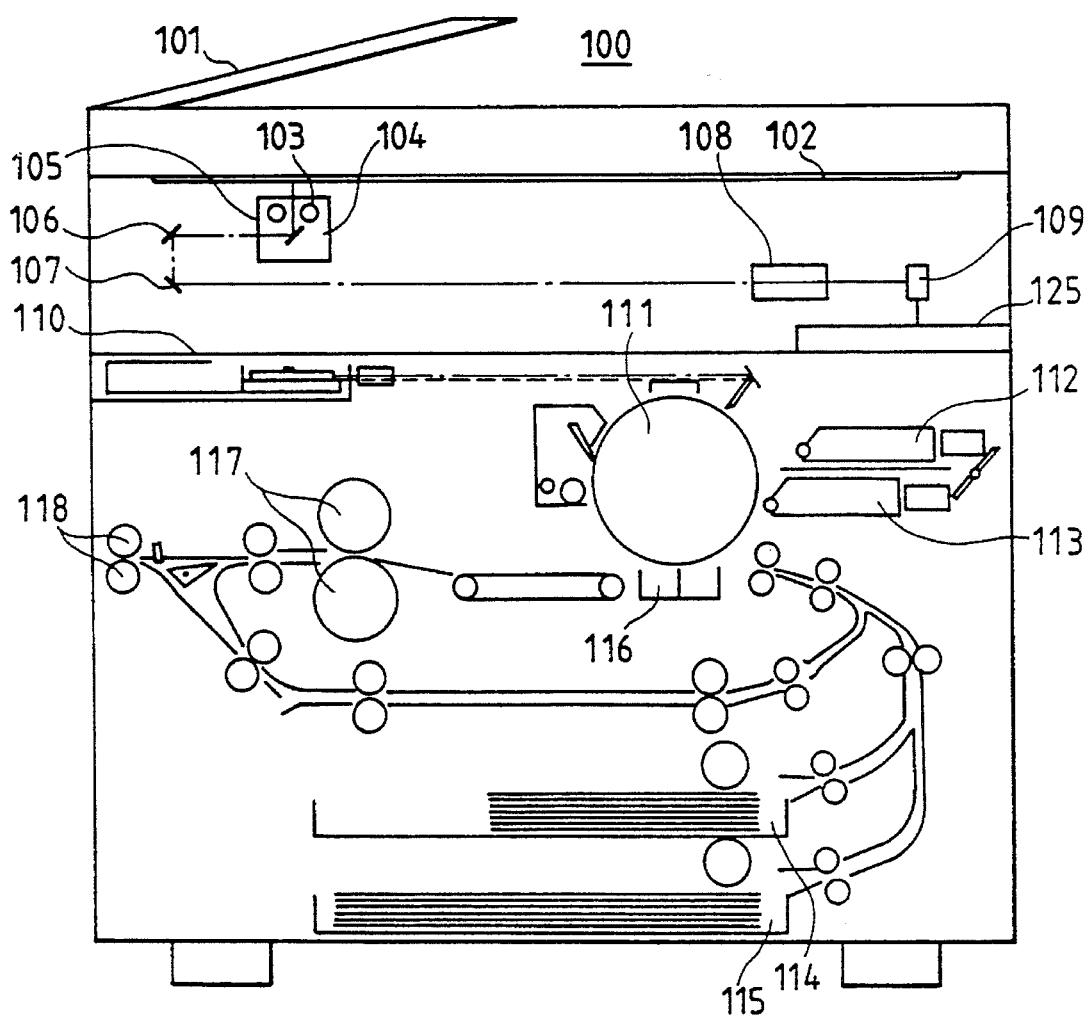
FIG. 2 is a sectional view showing the overall arrangement of the digital copying apparatus shown in FIG. 1.

FIG. 2 is a side sectional view showing the arrangement of the digital copying apparatus 100. The copying operation executed by the digital copying apparatus 100 will be explained below with reference to FIG. 2.

Originals stacked on an original feeder 101 are sequentially conveyed one by one onto the surface of an original table glass 102. When an original is fed, a lamp 103 in a scanner portion is turned on, and a scanner unit 104 is moved to illuminate the original. Light reflected by the original is transmitted through a lens 108 via mirrors 105, 106, and 107, and is then input to an image sensor unit 109.

An image signal input to the image sensor unit 109 is subjected to proper image processing in an image processing unit 125, and the processed image signal is input to an exposure control unit 110. The processed image signal is converted into an optical signal by the exposure control unit 110, and the optical signal is radiated onto a photosensitive drum 111. A latent image formed on the photosensitive drum 111 by the radiated light is developed by a developing unit 112 or 113. A transfer sheet is fed from a transfer sheet stacking unit 114 or 115 in synchronism with the latent image formation, and the toner image developed by the developing unit 112 or 113 is transferred onto the transfer sheet by a transfer unit 116. The transferred toner image is fixed on the transfer sheet by a fixing unit 117, and the transfer sheet is exhausted outside the apparatus by an exhaust unit 118.

Figure 3:
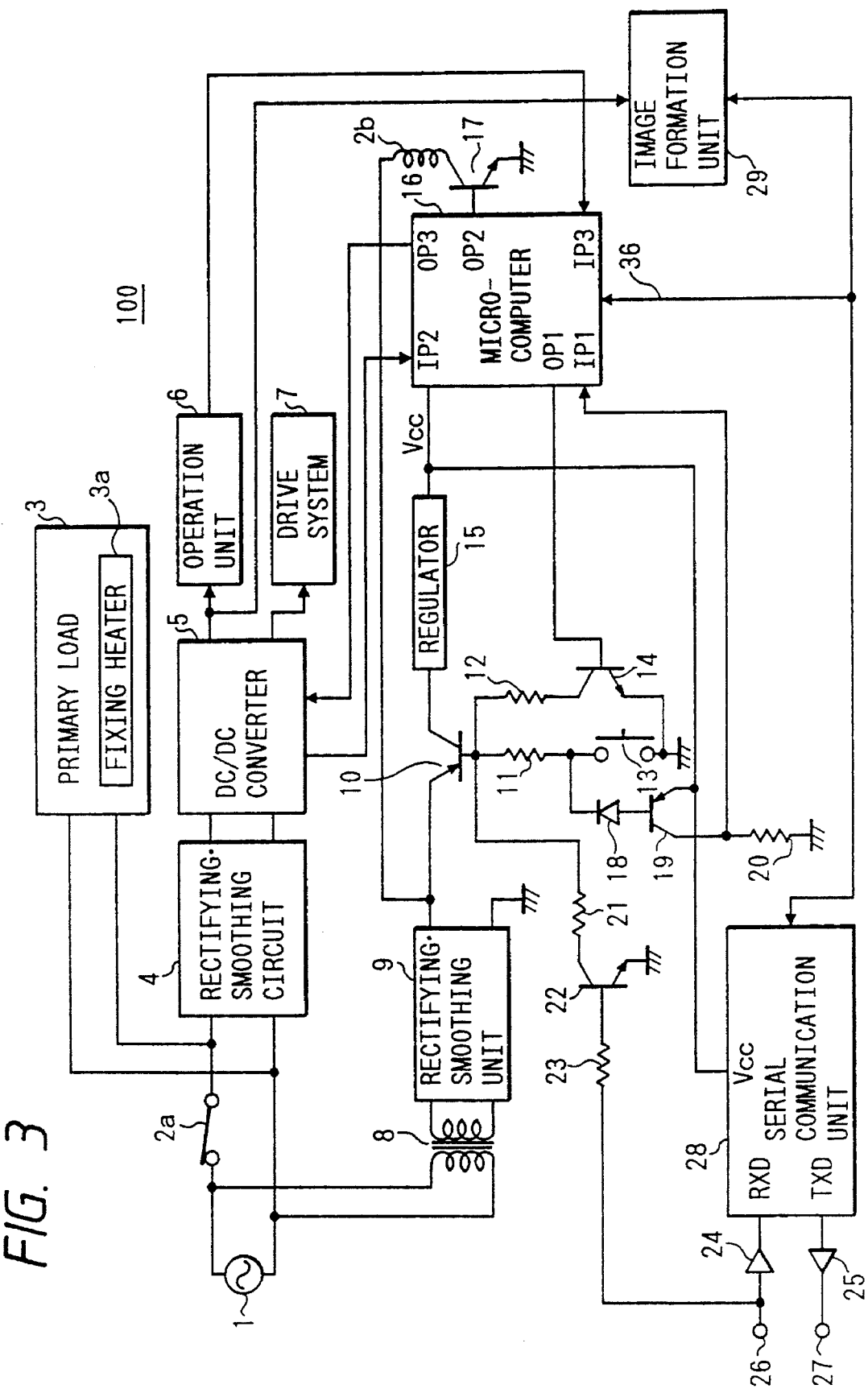
FIG. 3 is a block diagram showing a characteristic arrangement of a digital copying apparatus according to the first embodiment of the present invention.

FIG. 3 shows the characteristic arrangement of the digital copying apparatus according to the first embodiment of the present invention. The digital copying apparatus 100 serves as a printer in accordance with commands from an externally connected apparatus such as the personal computer 200 by performing data communications with the externally connected apparatus via a communication connector, in addition to a function of copying an original.

Referring to FIG. 3, the digital copying apparatus comprises a commercial power supply 1, a contact 2a and an excitation coil 2b of an electromagnetic relay, a primary load 3 including a fixing heater 3a and the like, a rectifying.smoothing circuit 4 for rectifying.smoothing an AC power supply voltage supplied via the contact 2a, and outputting a DC voltage, a DC/DC converter 5 for insulating the smoothed DC voltage, and outputting a stabilized low DC voltage, an operation unit 6 including LEDs for display and key input switches such as a copy key and the like, a drive system 7 including motors and solenoids, a transformer 8 for insulating a voltage from the commercial power supply to convert it into a desired AC voltage, a rectifying.smoothing unit 9 for rectifying. smoothing the AC voltage generated at the secondary side of the transformer 8, and outputting a desired DC voltage, a switching transistor 10 for turning on/off the DC voltage output from the rectifying.smoothing unit 9, a regulator 15 for outputting the DC voltage input from the switching transistor 10 as, e.g., a stabilized high voltage of DC 5 V, a microcomputer 16 for controlling the overall apparatus, a transistor 17 for driving the electromagnetic relay, a reception buffer 24 for receiving a serial signal from the externally connected apparatus, a transmission buffer 25 for outputting a signal to the externally connected apparatus, reception and transmission connectors 26 and 27 for serial communications, and a serial communication unit 28 for performing serial communications with the external apparatus. The digital copying apparatus also comprises an image formation unit 29 which includes a CCD for reading an original image, an image processing unit for processing image data read by the CCD to obtain a good copy image, a printer unit for forming an image by modulating a laser beam, and a print control unit for developing print data from the external apparatus into bit map data, and printing out the bit map data. The microcomputer 16 has control unit ports IP1 to IP3, and control output ports OP1 to OP3. The microcomputer 16 exchanges data with the serial communication unit 28 and the image formation unit 29 via an address/data bus 36. The serial communication unit 28 has a data input terminal RXD and a data output terminal TXD.

AC electric power is supplied from the commercial power supply 1 to the apparatus via a power supply plug, and the like. The electromagnetic relay constituting a power supply switch is of a normally open type. When the excitation coil 2b is energized, the electromagnetic relay closes the contact 2a, and supplies electric power to the primary load 3 including the fixing heater 3a and the like, and the rectifying.smoothing circuit 4.

An AC voltage input to the rectifying.smoothing circuit 4 is rectified and smoothed by the circuit 4 to be converted into a DC voltage. The DC voltage is input to the DC/DC converter 5. The DC/DC converter 5 insulates the input DC voltage to convert into a stabilized low DC voltage.

The low DC voltage stabilized by the DC/DC converter 5 is supplied to the operation unit 6 including LEDs for display and key input switches such as a copy key and the like, the image formation unit 29, and the drive system 7 including motors and solenoids.

On the other hand, the commercial power supply 1 is connected to the transformer 8, and the insulated secondary side output of the transformer 8 is supplied to the rectifying.smoothing unit 9. The voltage is rectified and smoothed by the rectifying.smoothing unit 9 to be converted into a desired DC voltage. The output from the rectifying.smoothing unit 9 is supplied to the excitation coil 2b of the electromagnetic relay, and the emitter of the switching transistor 10.

The base of the switching transistor 10 is connected to an operation switch 13 via a resistor 11. The operation switch 13 is used by a user to turn on/off the power supply of the apparatus. The contact of the switch 13 is closed only while the user depresses the switch 13. For example, the switch 13 comprises a tact switch.

The terminal, on the side of the resistor 11, of the operation switch 13 is connected to the cathode of a diode 18, and the anode of the diode 18 is connected to the base of a transistor 19. The emitter of the transistor 19 is connected to a power supply Vcc, and its collector is connected to a resistor 20 and to the input port IP1 of the microcomputer 16 constituting an electronic circuit portion for controlling the overall apparatus. Thus, the microcomputer 16 can read the operation state of the operation switch 13.

The base of the switching transistor 10 is connected to the collector of a transistor 14 via a resistor 12. The emitter of the transistor 14 is connected to ground, and its base is connected to the output port OP1 of the microcomputer 16. Furthermore, the base of the switching transistor 10 is connected to the collector of a transistor 22 via a resistor 21.

The collector of the switching transistor 10 is connected to the input terminal of the regulator 15. The regulator regulates the input voltage, and outputs high stabilized electric power of, e.g., DC 5 V. The electric power of DC 5 V is connected to a power supply input terminal Vcc of the microcomputer 16 and the serial communication unit 28.

The microcomputer 16 incorporates control hardware for the DC/DC converter 5, and receives a voltage detection signal from the DC/DC converter 5 at its input terminal IP2. The microcomputer 16 controls (e.g., PWM-controls) an output from the output port OP3 in accordance with the input voltage detection signal. The microcomputer 16 constant-voltage controls the output from the DC/DC converter 5 by the output control of the output port OP3. Note that control operations for stopping the output from the output port OP3, outputting a control output, and so on are realized by a program stored in an internal memory of the microcomputer 16.

The other terminal of the excitation coil 2b of the relay is connected to the collector of the transistor 17. The base of the transistor 17 is connected to the output port OP2 of the microcomputer 16, and its emitter is connected to ground.

The operation unit 6 includes operation switches such as a copy key, and its output is input to the input port IP3 of the microcomputer 16. The microcomputer 16 can read the operation state of the operation switches (not shown) of the operation unit 6.

The reception connector 26 is connected to a serial data input line from the externally connected apparatus, and is also connected to a resistor 23 and the input terminal of the reception buffer 24. One terminal of the resistor 23 is connected to the base of the transistor 22. The emitter of the transistor 22 is connected to ground, and its collector is connected to one. terminal of the resistor 21. The output terminal of the reception buffer 24 is connected to the input terminal RXD of the serial communication unit 28. The output terminal TXD is connected to the connector 27 via the transmission buffer 25, and transfers serial data to the externally connected apparatus. The serial communication unit 28 is a communication control circuit including a serial/parallel conversion unit, and is connected to the address/data bus 36 of the microcomputer 16. Thus, the microcomputer 16 can perform desired data communications with the externally connected apparatus. The address/data bus 36 is also connected to the image formation unit 29.

The operation of the first embodiment with the above-mentioned arrangement will be described in detail below. First, a state will be described below wherein the digital copying apparatus is not active. When a plug is connected to the commercial power supply 1, AC electric power is supplied to the transformer 8, and the rectifying.smoothing unit 9 outputs a predetermined DC voltage.

On the other hand, the switching transistor 10 is OFF, and no power supply voltage is supplied to the microcomputer 16. For this reason, no signal is output from the output port OP2, and the transistor 17 is also OFF. Therefore, the excitation coil 2b of the electromagnetic relay is not energized, and the contact 2a of the relay is open, so that the primary load 3, the smoothing-rectifying circuit 4, and the like are disconnected from the commercial power supply 1, and no AC electric power is supplied thereto.

In this state, when the operation switch 13 is depressed or communication data is sent from the externally connected apparatus via the connector 26, the digital copying apparatus is started.

An operation executed when the operation switch 13 is depressed will be described below. When the operation switch 13 is depressed, its contact is closed, and a base power supply current is supplied to the switching transistor 10 via the resistor 11, thus turning on the switching transistor 10. Thus, electric power from the rectifying.smoothing unit 9 is supplied to the regulator 15, and a DC power supply voltage Vcc (in this embodiment, DC 5 V) is supplied to the microcomputer 16. For this reason, the microcomputer 16 receives an operation power supply voltage, and starts an operation to be described in detail later. The microcomputer 16 turns on its output port OP1 to turn on the transistor 14.

When the transistor 14 is turned on, a base current is supplied to the switching transistor 10 via the resistor 12. Thereafter, even when the contact of the operation switch 13 is opened, the base current continues to be supplied from the transistor 14 to the base of the switching transistor 10. For this reason, the operation power supply voltage is kept supplied to the microcomputer 16 unless the output port OP1 is turned off (operation holding means).

When the operation switch 13 is depressed, a base current is supplied to the transistor 19 via the diode 18 to turn on the transistor 19, and the input port IP1 of the microcomputer 16 is set at high level. When the operation switch 13 is released, the input port IP1 is set at low level.

The microcomputer 16 turns on the output port OP2 to turn on the transistor 17 after it turns on the output port OP1. As a result, a current is supplied to the excitation coil 2b of the electromagnetic relay, and the electromagnetic relay operates to close the contact 2a. As a result, after an elapse of an operation time required for closing the contact 2a of the electromagnetic relay, an operation power supply voltage is supplied to the primary load 3 and the rectifying.smoothing circuit 4. Also, DC electric power from the rectifying.smoothing circuit 4 is supplied to the DC/DC converter 5.

After an elapse of an operation time required for closing the contact 2a of the electromagnetic relay (after DC electric power from the rectifying-smoothing circuit 4 is supplied to the DC/DC converter 5), the microcomputer 16 sets the output port OP3 in a control state, and constant-voltage controls the output from the DC/DC converter 5 in accordance with a signal input to the input port IP2. Then, a predetermined constant voltage is supplied to the operation unit 6, the image formation unit 29, and the drive system 7, and a user can perform desired copy processing and print-out processing.

A case will be described below wherein the digital copying apparatus is started in response to communication data from the externally connected apparatus. The line of the reception connector 26 is set at "0" level in a normal state (when no data is supplied), and the transistor 22 connected to the connector 26 via the resistor 23 is OFF. When proper communication data is supplied from the externally connected apparatus, the line of the reception connector 26 is set at "1" level, and a base current is supplied to the transistor 22 via the resistor 23 to turn on the transistor 22. As a result, a base current is supplied to the switching transistor 10 via the resistor 21 to turn on the switching transistor 10. Since the subsequent operations are the same as those executed when the apparatus is started by the operation switch 13, a detailed description thereof will be omitted.

An operation executed when the power supply of the digital copying apparatus is turned off will be described below. When the operation switch 13 is depressed, its contact is closed, and the input port IP1 of the microcomputer 16 is set at high level. The microcomputer 16 checks the state of the input port IP1, and can recognize depression of the operation switch 13 by detecting the high-level state of the input port IP1.

When the contact of the operation switch 13 is opened, the microcomputer 16 turns off the output port OP3 to stop the operation of the DC/DC converter 5, thereby stopping power supply to the operation unit 6, the drive system 7, and the like. Thereafter, the microcomputer 16 turns off the output port OP2 to turn off the transistor 17, thereby stopping energization to the excitation coil 2b of the electromagnetic relay. When energization to the excitation coil 2b of the electromagnetic relay is stopped, the contact 2a is opened. As a result, power supply to the primary load 3 and the rectifying.smoothing circuit 4 is stopped, and power supply to the DC/DC converter 5 is also stopped.

The microcomputer 16 finally turns off the output port OP1 to turn off the transistor 14, thus turning off the switching transistor 10. As a result, supply of a power supply voltage Vcc to the microcomputer 16 is stopped, and the operation of the microcomputer 16 is stopped.

In the above description, the operation for turning off the power supply using the operation switch 13 has been described. Also, the power supply can be turned off by the same operation as described above when a power OFF command is supplied from the externally connected apparatus, when the apparatus is not operated for a predetermined period of time, or when an abnormality of the fixing heater, or the like is detected.

Figure 4:
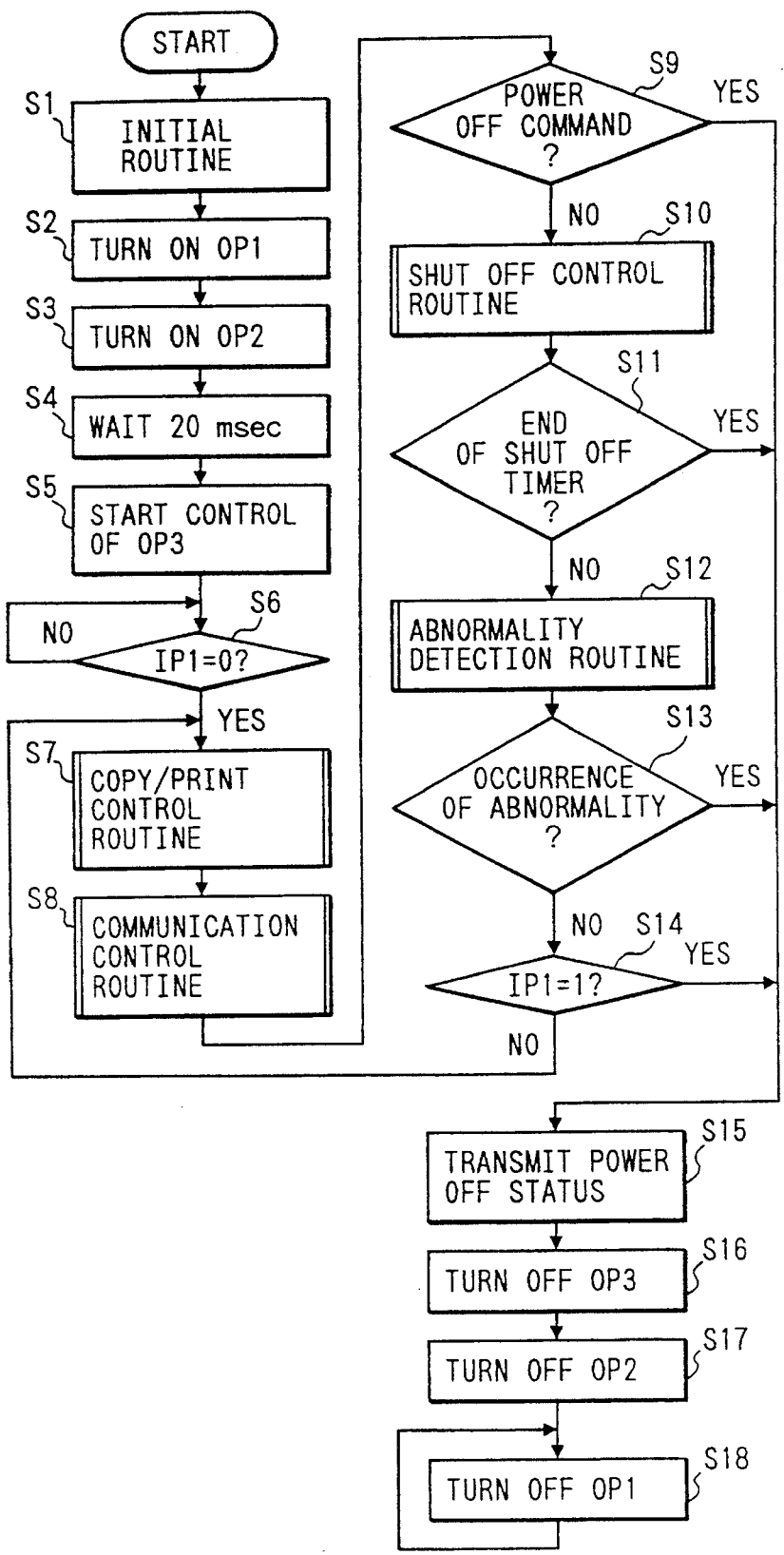
FIG. 4 is a flow chart showing a control operation of the digital copying apparatus of the first embodiment.

The operation (mainly, power supply control) of the microcomputer 16 will be described in detail below. FIG. 4 is a flow chart showing the control operation of the microcomputer 16, and the following description will be made with reference to this flow chart. As described above, when the operation switch 13 is depressed, or when communication data is supplied from the externally connected apparatus, an operation power supply voltage is supplied to the microcomputer 16, and the microcomputer 16 starts its operation from step S1. In step S1, an initial routine is executed to initialize internal registers (not shown) of the microcomputer 16 and to initialize and clear an internal RAM (not shown). The flow advances to step S2. In step S2, the microcomputer 16 turns on the output port OP1 to maintain a state wherein an operation power supply voltage Vcc is kept supplied to the microcomputer 16.

In step S3, the microcomputer 16 turns on the output port OP2 to energize the excitation coil 2b of the electromagnetic relay, thereby closing the contact 2a. In step S4, the microcomputer 16 waits for a time (20 msec as the operation time of the contact 2a in this embodiment) required for the relay operation, and after an elapse of the wait time, the flow advances to step S5.

In step S5, the microcomputer 16 sets the output port OP3 in a control state to enable the output from the DC/DC converter 5.

In step S6, the microcomputer 16 checks if the input port IP1 is "0", i.e., if the operation switch 13 is closed. If NO in step S6, the loop of step S6 is repeated; if YES in step S6, the microcomputer 16 executes operations in step S7 and subsequent steps.

In step S7, a control routine for the digital copying apparatus is executed. In this routine, control operations such as display control of the operation unit 6, a copy operation, a print operation, and the like are performed. In step S8, the microcomputer 16 executes communication control with the externally connected apparatus. In step S9, the microcomputer 16 checks if a power OFF command is supplied from the externally connected apparatus. If YES in step S9, the microcomputer 16 executes step S15 and subsequent steps; if NO in step S9, the flow advances to step S10. In step S10, a shut off control routine is executed. In this routine, it is detected if no copy or print operation is performed for a predetermined period of time. A shut off timer is set to be a predetermined value upon completion of a copy or print operation, or upon depression of a given key on the operation unit 6, and is cleared when a copy or print operation is started. In step S11, the microcomputer 16 checks the end of the shut off timer. If YES in step S11, the flow advances to step S15 to turn off the power supply since no copy or print request is input from a user or the externally connected apparatus for a predetermined period of time.

On the other hand, if NO in step S11, the flow advances to step S12. In step S12, a routine for detecting an abnormality of this apparatus is executed, and is realized by, e.g., a known program for detecting a temperature abnormality of the fixing heater.

The microcomputer 16 checks in step S13 if an abnormality occurs. If YES in step S13, the flow advances to step S16; if NO in step S13, the flow advances to step S14. The microcomputer 16 checks in step S14 if the input port IP1 is "1", i.e., if the operation switch 13 is depressed. If YES in step S14, the flow advances to step S15; if NO in step S14, the microcomputer executes step S7 and subsequent steps again.

In step S15 and subsequent steps, processing for turning off the power supply is executed. In step S15, the microcomputer 16 transmits power off status data of this apparatus to the externally connected apparatus. In step S16, the microcomputer 16 turns off the output port OP3 to stop the DC/DC converter 5.

In step S17, the microcomputer 16 turns off the output port OP2 to stop energization to the excitation coil 2b of the electromagnetic relay, thus opening the relay contact 2a. Thus, the microcomputer 16 stops power supply to the primary load 3 and the rectifying.smoothing circuit 4.

In step S18, the microcomputer 16 turns off the output port OP1 to make control for turning off the power supply of the microcomputer 16. Step S18 is repeated for a short period of time required for disabling the power supply, and thereafter, the microcomputer 16 stops its operation.

[Second Embodiment]

Figure 5:
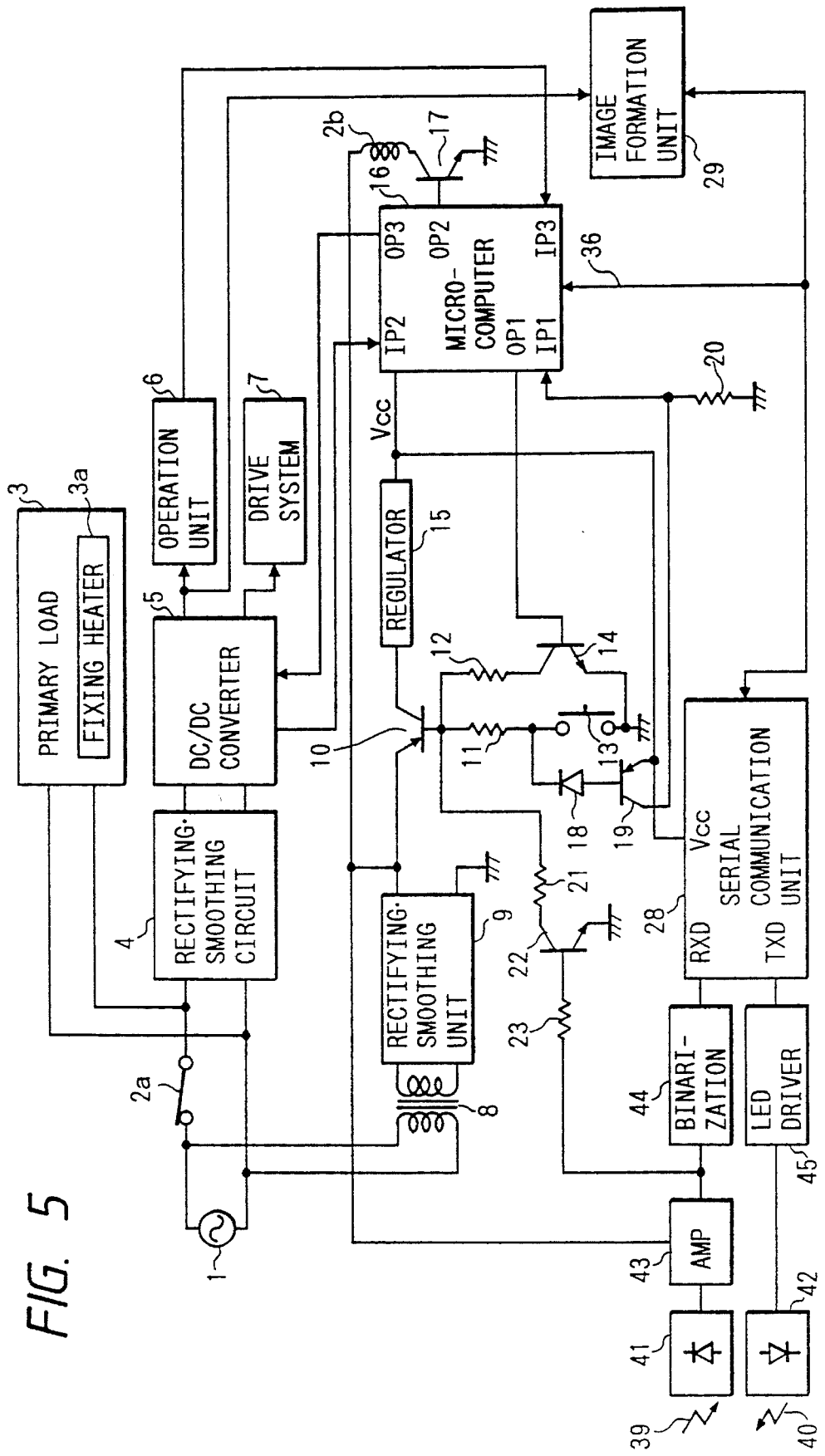
FIG. 5 is a block diagram showing a characteristic arrangement of a digital copying apparatus according to the second embodiment of the present invention.

FIG. 5 is a block diagram showing the second embodiment of the present invention, and shows a digital copying apparatus similar to that of the first embodiment. The same reference numerals in FIG. 5 denote the same parts as in FIG. 3. Referring to FIG. 5, a photodetector 41 receives an optical signal 39, and an LED 42 converts an electrical signal into an optical signal 40. An amplifier 43 amplifies a current converted by the photodetector 41. A binarization circuit 44 converts a signal amplified by the amplifier 43 into "1" or "0" level. An LED driver 45 supplies serial data from the serial communication unit 28 to the LED 42.

The digital copying apparatus of this embodiment is connected to the externally connected apparatus by optical communications via an optical fiber. The optical signal 39 from the externally connected apparatus is detected by the photodetector 41 such as a photodiode, and a current based on the detected light is amplified and converted into a voltage by the amplifier 43. The amplifier 43 receives a power supply voltage output from the rectifying.smoothing unit 9. That is, the amplifier 43 can operate as long as the apparatus is connected to the commercial power supply 1. The output from the amplifier 43 is connected to the resistor 23, and is also supplied to the binarization circuit 44. The input voltage is converted into "1" or "0" level by the binarization circuit 44, and the converted signal is supplied to the input terminal RXD of the serial communication unit 28. On the other hand, the output terminal TXD of the serial communication unit 28 is connected to the LED driver 45 to drive the LED 42. The optical signal 40 output from the LED 42 is transmitted to the externally connected apparatus via an optical fiber.

An operation executed when the power supply of this apparatus is turned off in the above-mentioned arrangement will be explained below. When no communication data is supplied from the externally connected apparatus, i.e., when no optical signal 39 is input, no current is supplied to the photodetector 41 such as a photodiode, and the output from the amplifier 43 is set at low level. Therefore, the transistor 22 connected to the amplifier 43 via the resistor 23 is OFF. For this reason, the switching transistor 10 is OFF, and the microcomputer 16 is disabled since no power supply voltage is supplied thereto.

On the other hand, when communication data is supplied from the externally connected apparatus, i.e., when the optical signal 39 is input via an optical fiber, a current is supplied to the photodetector 41 such as a photodiode, and the current is amplified by the amplifier 43 to be converted into a voltage. Based on the converted voltage, a base current is supplied to the transistor 22 via the resistor 23. Then, the apparatus is started by the same operation as in the first embodiment.

In this embodiment, the apparatus is started by a signal from the serial data line. However, if a serial data communication protocol control line, e.g., a transmission request signal line, is available, the apparatus may be started by a signal from this signal line.

[Third Embodiment]

Figure 6:
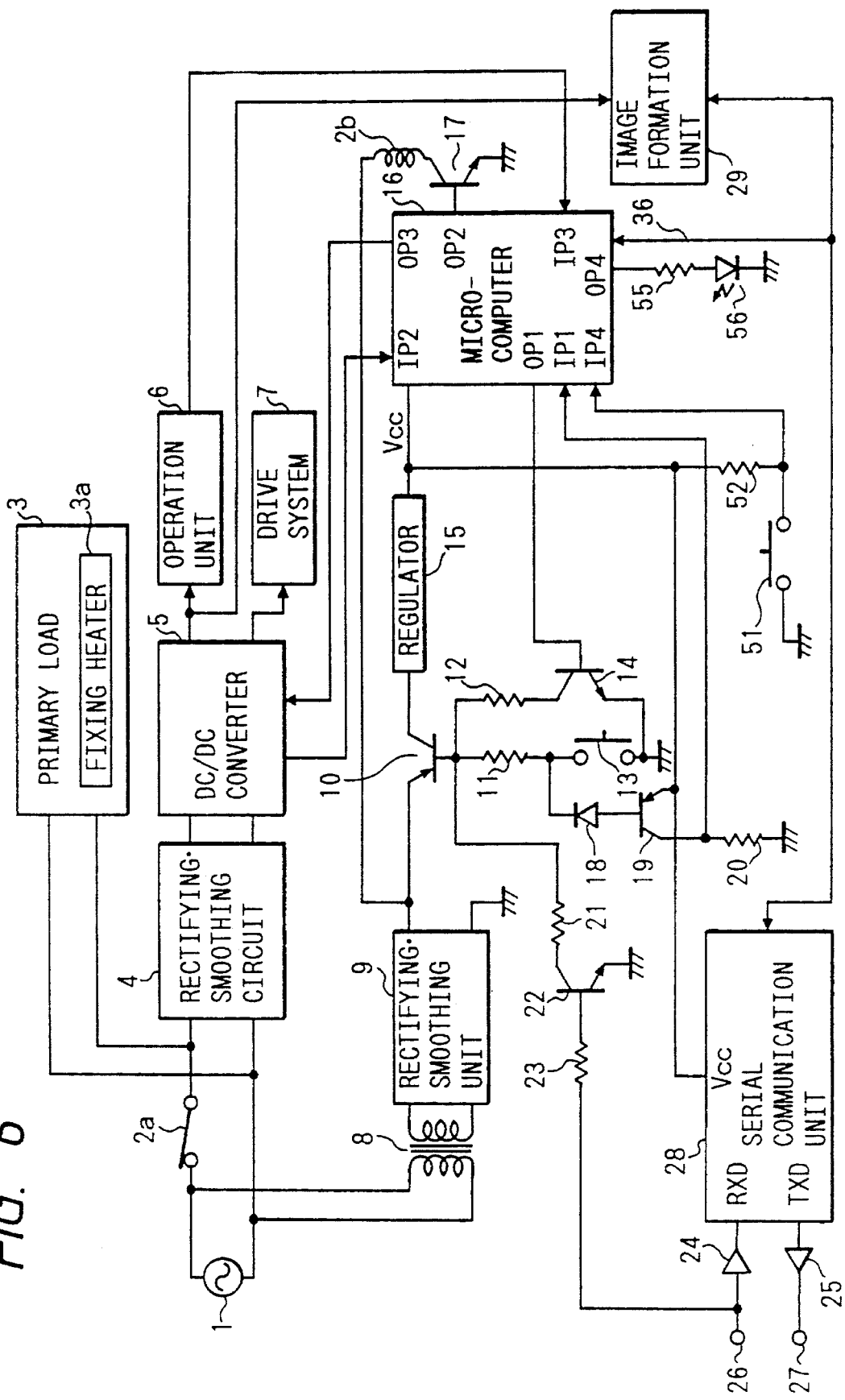
FIG. 6 is a block diagram showing a characteristic arrangement of a digital copying apparatus according to the third embodiment of the present invention.
Figure 7A:
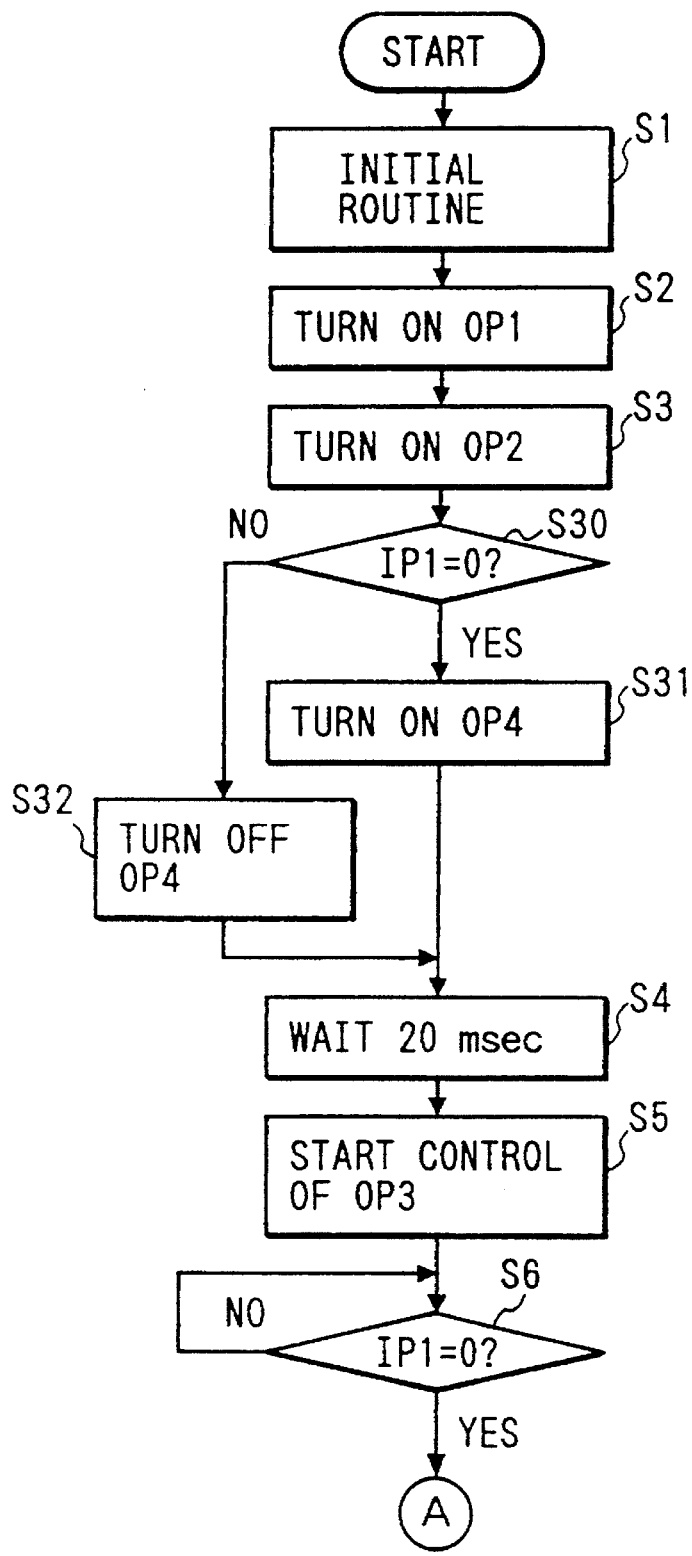
FIG. 7, comprised of FIGS. 7A and 7B, and FIG. 8 are flow charts for explaining the operation of the third embodiment.
Figure 7:
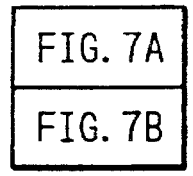
Figure 8:
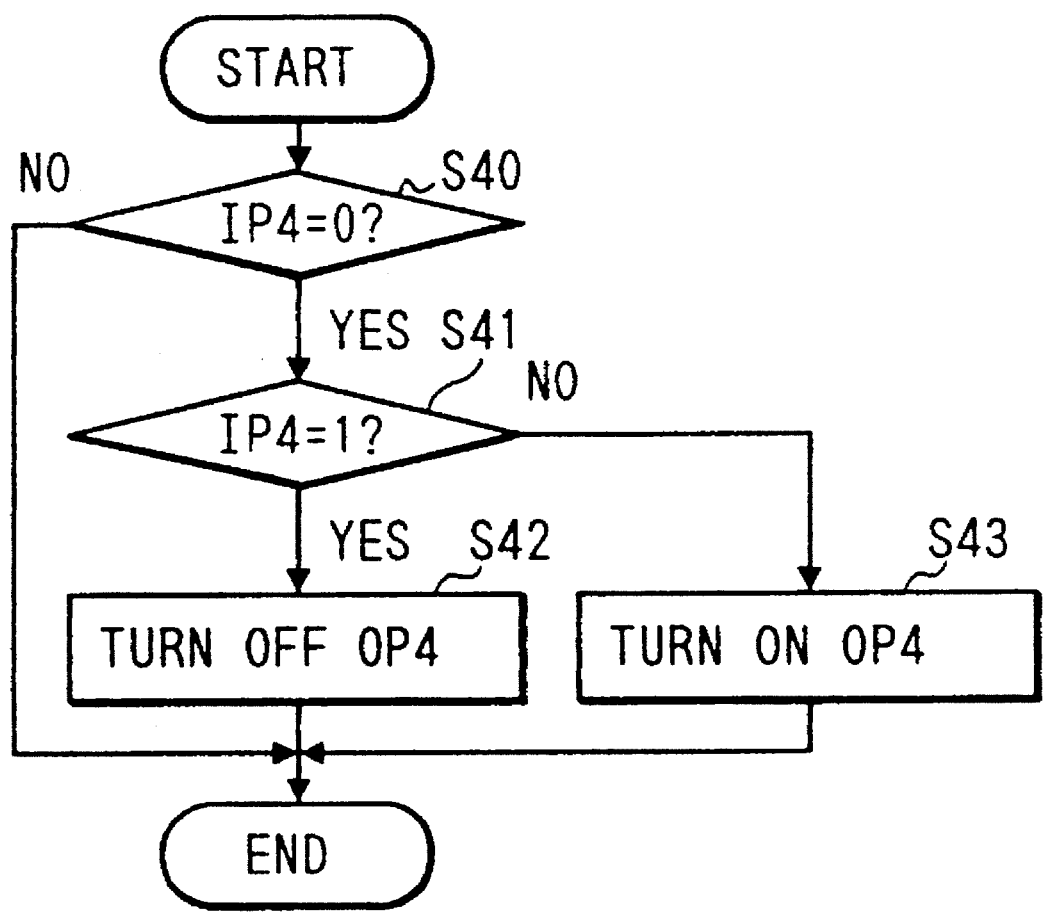

The third embodiment of the present invention will be described below with reference to FIGS. 6 to 8. FIG. 6 is a block diagram of the third embodiment, and shows a digital copying apparatus similar to that of the first embodiment. The same reference numerals in FIG. 6 denote the same parts as in FIG. 3. In FIG. 6, in a state wherein a tact switch 51 is not depressed, a power supply Vcc supplies "1" level to an input port IP4 of the microcomputer 16 via a resistor 52. On the other hand, when the switch 51 is depressed, the input port IP4 is connected to ground (GND), and is set at "0" level. An output port OP4 of the microcomputer 16 is connected to an LED 56 via a resistor 55. When the output port OP4 is set at "1", the LED 56 is turned on; when it is set at "0", the LED 56 is turned off. The switch 51 is used for switching the mode of the digital copying apparatus. Upon depression of the switch 51, the mode of the digital copying apparatus 100 is switched between a remote mode in which the digital copying apparatus 100 operates in accordance with commands from the personal computer 200, and a local mode in which the digital copying apparatus 100 independently operates irrespective of commands from the personal computer 200. In the remote mode, the LED 56 is turned on to indicate that the digital copying apparatus 100 is set in the remote mode.

Figure 7B:
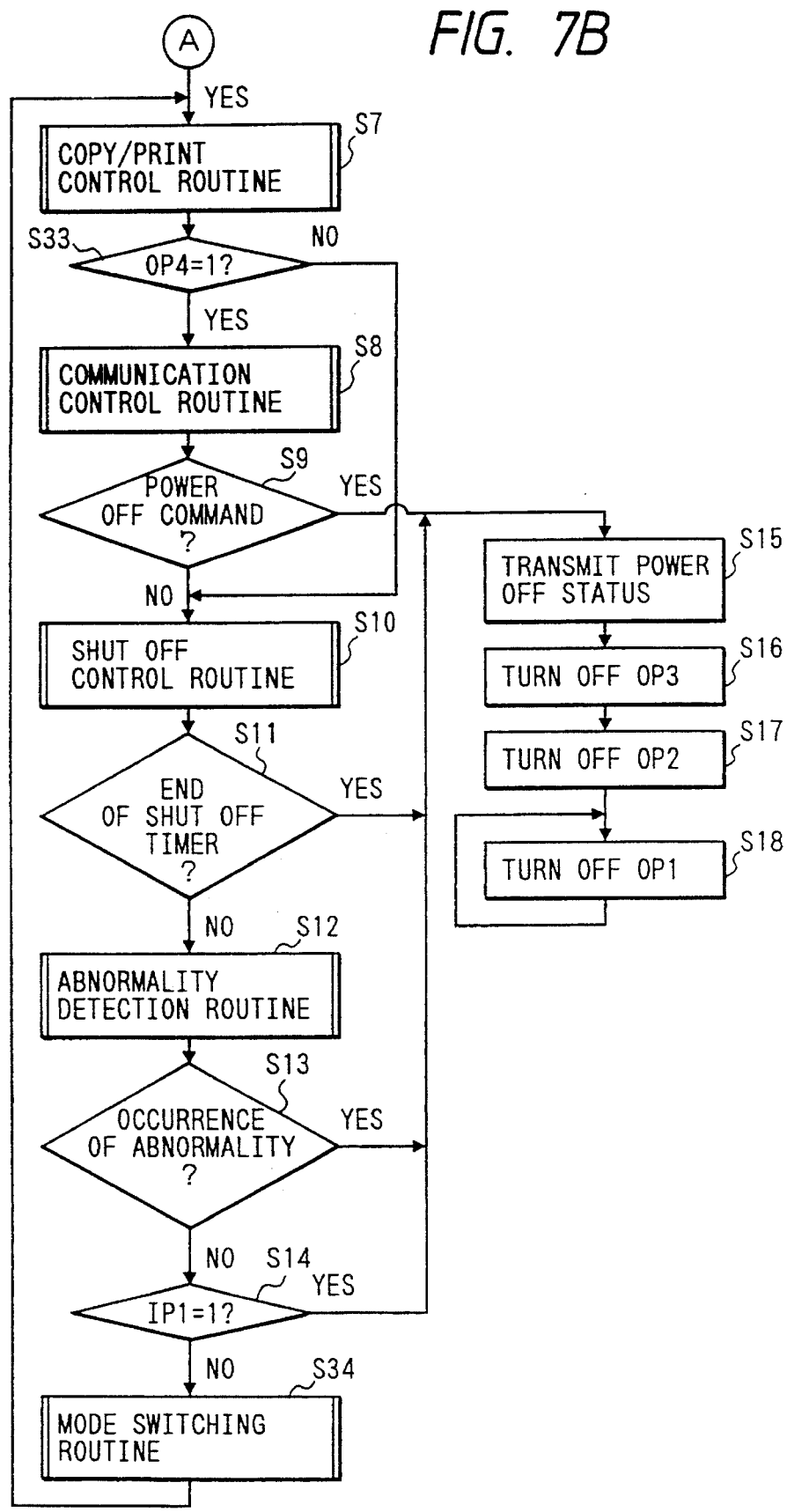

The operation (mainly, power supply control) of the microcomputer 16 will be described below with reference to the flow chart in FIGS. 7A and 7B. Note that the same step numbers in FIGS. 7A and 7B denote the same operations as in FIG. 4, and a detailed description thereof will be omitted. Steps S1 to S3 are the same as those in FIG. 4. In step S30, it is checked if the input port IP1 is "0". If YES in step S30, since it is determined that the apparatus is started not by the operation switch 13 but by communication data from the personal computer 200, the flow advances to step S31 to turn on the output port OP4, thus turning on the LED 56 and indicating that the remote mode is set. Thereafter, the flow advances to step S4. However, if NO in step S30, since it is determined that the apparatus is started by the operation switch 13, the output port OP4 is turned off in step S32 to turn off the LED 56, thus indicating that the local mode is set. Thereafter, the flow advances to step S4.

In steps S4 to S7, the same operations as in FIG. 4 are performed. After step S7, the flow advances to step S33 to check if OP4 ="1". If YES in step S33, since the remote mode is set, the same operations as in steps S8 and S9 in FIG. 4 are executed in steps S8 and S9. If YES is determined in step S9, the flow advances to step S15; otherwise, the flow advances to step S10. On the other hand, if NO in step S33, since the local mode is set, the flow jumps to step S10 without executing steps S8 and S9. In steps S11 to S14, the same operations as in FIG. 4 are executed. If NO is determined in step S14, a local mode/remote mode switching routine (to be described later) is executed in step S34 to switch the mode, and the flow then returns to step S7. In steps S15 to S18, the same operations as in FIG. 4 are executed.

The mode switching routine in step S34 will be described below with reference to the flow chart in FIG. 8. In step S40, it is checked if IP4="0". If NO in step S40, since it is determined that the switch 51 is depressed, the flow ends. If YES in step S40, since it is determined that the switch 51 is depressed, it is then checked in step S41 if OP4="1", i.e., if the remote mode is set. If YES in step S41, the flow advances to step S42, and the output port OP4 is turned off to turn off the LED 56, thereby indicating that the local mode is set. Thereafter, the flow ends.

On the other hand, if YES in step S41, the flow advances to step S43, and the output port OP4 is turned on to turn on the LED 56, thus indicating that the remote mode is set. That is, the mode is switched every time the switch 51 is depressed.

As described above, according to this embodiment, when the digital copying apparatus is started by communication data from the personal computer 200, the remote mode is automatically set. On the other hand, when the digital copying apparatus is started by the operation switch 13, the local mode is automatically set, thus requiring no troublesome operations of a user, and preventing an erroneous operation.

In the above description, the digital copying apparatus has been exemplified. However, the present invention is not limited to this, but may be applied to a printer, scanner, and the like.

As described above, according to the present invention, a user need not perform a cumbersome ON/OFF operation of a power supply switch in a print operation, and a wasteful operation such as a print operation when the power supply switch is OFF can be prevented, thus improving operability.

Since the apparatus is energized only while it is in use, the present invention is advantageous in terms of energy savings, and since the energization time is shortened, reliability and safety can be improved. Also, according to the present invention, ON/OFF control of the apparatus can be realized without increasing the number of communication lines with, e.g., a personal computer, that is, without increasing cost or changing the hardware arrangement of a personal computer.

The present invention is not limited to the above-mentioned embodiments, and various modifications may be made within the scope of claims.

What is claimed is:

1. An electronic apparatus comprising:

first switch means for switching a first power supply;

second switch means for switching a second power supply, said second switch means being turned on in response to an ON state of said first switch means;

communication means for performing an image data communication with an external apparatus; and holding means for holding the ON state of said first switch means, wherein said apparatus comprises control means for controlling a holding operation of said holding means, said first switch means, or said second switch means, in accordance with a signal received via said communication means.

2. An apparatus according to claim 1, wherein said control means comprises means for turning on said first switch means in response to a first signal received via said communication means.

3. An apparatus according to claim 2, wherein said apparatus comprises a digital copying apparatus having a remote mode for printing data received via said communication means, and a local mode for recording an original image read by said digital copying apparatus, and wherein said apparatus comprises manual operation means for manually turning on/off said first switch means, and the local mode is set when said first switch means is turned on by said manual operation means, and the remote mode is set when said first switch means is turned on by said control means in response to the first signal received via said communication means.

4. An apparatus according to claim 1, wherein said control means comprises a CPU for canceling the holding operation of said holding means and turning off said second switch means in response to a second signal received via said communication means.

5. An apparatus according to claim 4, wherein said CPU cancels the holding operation of said holding means and turns off said second switch means after an elapse of a predetermined period of time from the end of an operation.

6. An apparatus according to claim 4, wherein said apparatus comprises a digital copying apparatus having a remote mode for printing data received via said communication means, and a local mode for recording an original image read by said digital copying apparatus, and wherein said digital copying apparatus comprises manual operation means for manually turning on/off said first switch means of said apparatus, and said CPU does not cancel the holding operation of said holding means and turn off said second switch means in response to the second signal received via said communication means during the local mode.

7. An apparatus according to claim 1, wherein said control means comprises a CPU energized by said first power supply.

8. An apparatus according to claim 7, wherein said CPU cancels the holding operation of said holding means and turns off said second switch means in response to a second signal received via said communication means.

9. An apparatus according to claim 1, wherein said apparatus comprises a digital copying apparatus.

10. An apparatus according to claim 9, wherein said digital copying apparatus comprises a fixing heater for thermally fixing an image formed on a recording medium, and said fixing heater is energized by said second power supply.

11. An apparatus according to claim 1, wherein energization to a fixing heater is stopped by said second switch means.

12. A copying apparatus comprising:

input means for receiving data output from an external apparatus;

first control means, energized by a first power supply, for turning on/off a second power supply; and second control means for turning on the first power supply on the basis of a first signal received by said input means, wherein when said second control means turns on the first power supply on the basis of a first signal received by said input means, the first control means turns on the second power supply.

13. A copying apparatus according to claim 12, wherein said copying apparatus has a remote mode for printing data from an external apparatus, and a local mode for recording an original image read by said copying apparatus, said copying apparatus comprising manual operation means for manually turning on/off the power supply of said copying apparatus wherein said copying apparatus sets the local mode when the first and second power supplies are turned on by said manual operation means, and sets the remote mode when the first and second power supplies are turned on, on the basis of a first signal received by said input means.

14. An apparatus according to claim 13, further comprising means for identifiably indicating one of the local and remote modes.

15. An apparatus according to claim 13, wherein said first control means does not turn off the power supply of said copying apparatus on the basis of a signal received by said input means when the power supply is turned on by said manual operation means.

16. A copying apparatus according to claim 13, further comprising:

first switch means for switching the first power supply;

second switch means for switching the second power supply, said second switch means being turned on in response to an ON operation of said first switch means by said first control means; and holding means for holding an ON state of said first switch means, wherein said first control means turns off the first power supply by cancelling a holding state of said holding means, and turns off said second switch means, in accordance with a second signal received by said input means.

17. An apparatus according to claim 16, wherein said second control means turns on said first switch means in response to the first signal received by said input means.

18. An apparatus according to claim 16, further comprising third control means for cancelling the holding operation of said holding means and for turning off said second switch means after an elapse of a predetermined period of time from the end of an operation.

19. An apparatus according to claim 16, wherein said first control means comprises a CPU.

20. A copying apparatus according to claim 16, wherein said first control means turns off the first switch means by cancelling the holding operation of said holding means and turns off said second switch means in response to a second signal received by said input means.

21. An apparatus according to claim 16, further comprising a heater for thermally fixing an image formed on a recording medium, wherein said fixing heater is energized by said second power supply.

22. A copying apparatus according to claim 12, wherein said copying apparatus has a remote mode for printing data from an external apparatus, and a local mode for recording an original image read by said copying apparatus.

23. A copying apparatus according to claim 22, wherein said first control means turns off the first power supply and the second power supply on the basis of a second signal received by said input means.

24. A copying apparatus according to claim 23, wherein said first control means does not turn off the first and the second power supply on the basis of the second signal received by said input means when the power supply is turned on by said manual operation means.

25. A copying apparatus according to claim 23, wherein said first control means does not turn off the first power supply and the second power supply on the basis of the second signal during the local mode.

26. A copying apparatus according to claim 22, further comprising means for identifiably indicating one of the local and the remote modes.

27. A copying apparatus according to claim 22, further comprising means for manually switching the local mode and the remote mode.

28. A copying apparatus according to claim 12, further comprising:

first switch means for switching the first power supply;

second switch means for switching the second power supply, said second switch means being turned on in response to an ON operation of said first switch means by said first control means; and holding means for holding an ON state of said first switch means, wherein said first control means turns off the first power supply by cancelling a holding state of said holding means, and turns off said second switch means., in accordance with a second signal received by said input means.

29. A copying apparatus according to claim 28, wherein said second control means turns on said first switch means in response to the first signal received by said input means.

30. An apparatus according to claim 28, wherein said first control means cancels the holding operation of said holding means and turns off said second switch means after an elapse of a predetermined period of time from the end of an operation.

31. An apparatus according to claim 28, wherein said first control means comprises a CPU.

32. A copying apparatus according to claim 28, wherein said first control means turns off the first switch means by cancelling the holding operation of said holding means and turns off said second switch means in response to a second signal received by said input means.

33. An apparatus according to claim 28, further comprising a fixing heater for thermally fixing an image formed on a recording medium, wherein said fixing heater is energized by the power supply of said copying apparatus.

* * * * *

UNITED STATES PATENT AND TRADEMARK OFFICE
CERTIFICATE OF CORRECTION

PATENT NO. : 5,475,500
DATED : December 12, 1995
INVENTOR(S) : Takeda

It is certified that error appears in the above-indentified patent and that said Letters Patent is hereby corrected as shown below:

COLUMN 5:

Line 31, "one." should read --one--.

Signed and Sealed this

Sixteenth Day of April, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,475,500
DATED      : December 12, 1995
INVENTOR(S): Takeda

It is certified that error appears in the above-indentified patent and that said Letters Patent is hereby corrected as shown below:

<u>TITLE PAGE</u>
Please add:
--[30]  Foreign Application Priority Data:

Feb. 15, 1994   [JP]   Japan ...   6-018525--.

Signed and Sealed this

Fourteenth Day of May, 1996

Attest:

BRUCE LEHMAN

*Attesting Officer*     *Commissioner of Patents and Trademarks*